May 28, 1968     H. M. McCALL     3,385,613

QUICK DETACHABLE COUPLING

Filed May 23, 1966

3,385,613
QUICK DETACHABLE COUPLING
Harold M. McCall, Fairlawn, N.J., assignor to Raymond International Inc., New York, N.Y., a corporation of New Jersey
Filed May 23, 1966, Ser. No. 552,296
4 Claims. (Cl. 285—84)

ABSTRACT OF THE DISCLOSURE

A coupling arrangement for hoses and the like comprising a pair of elements one of which carries a rotatable sleeve which is threaded to it and which has formed thereon means for flangibly engaging with another member to be connected to the member on which the sleeve is mounted. The sleeve is arranged to provide an eccentric relationship so that locking and unlocking are successfully achieved at successive 180° rotational intervals of the sleeve.

---

Figure 1:
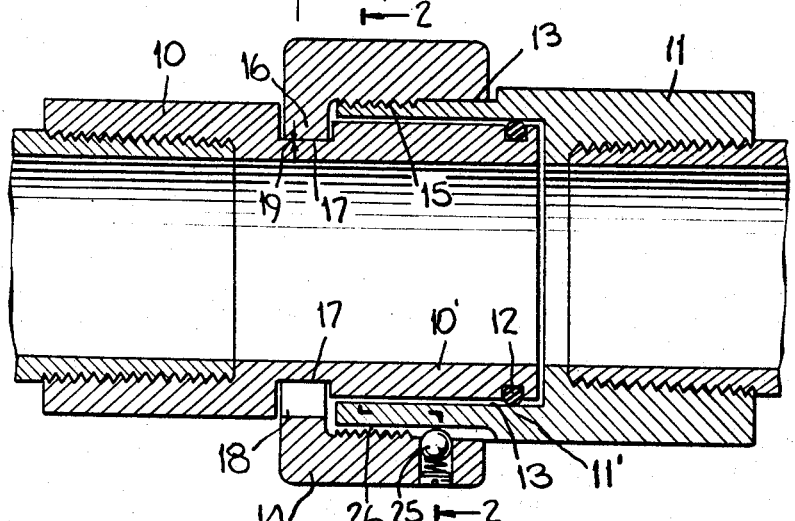

This invention relates to quickly detachable couplings, and is particularly well adapted among other uses, for swivel couplings such as for sections of conduits, hose, rods and the like.

For various purposes it is necessary to provide such couplings for successive lengths of hose, conduits and the like, for example hose adapted for carrying cement mortar, slurries or other fluids under pressure, and in many cases it is advantageous that such coupling be quickly detachable, particularly so that, whatever equipment is being used to receive the flowing fluid stream, it may be quickly detached from the source of fluid supply and moved to other locations or be replaced by other equipment.

The present invention provides a quite simple, inexpensive, easily-operated and reliable construction for the purpose and which is unusually compact both radially and longitudinally and has substantially a minimum number of operating parts.

In accordance with the present invention, telescoping male and female coupling parts are provided, surrounded by a nut member threaded onto the exterior of the female part. Such nut member has an inwardly-directed flange-like formation having a circular opening through which the male coupling member is inserted to extend into the female part. The neck of the male part is formed with a groove, which is adapted, when the coupling is locked together, to receive portions of the flange-like formation on the nut protruding into such groove. The external threaded surface of the female part, as well as the internal threaded surface of the nut member which engages same, are located somewhat eccentrically with respect to the main axis of the coupling. Also the circular opening through the flange formation on the nut is located eccentrically with respect to said threaded surfaces. When the parts are so arranged that the eccentricities of said threaded surfaces are displaced angularly by about 180° as compared with said eccentricity of the circular opening through the nut member flange, then the coupling parts will be locked together because portions of the flange formation on the nut will be engaged in the annular groove on the male part, thus preventing relative longitudinal separation of the parts of the coupling. On the other hand, if the nut is turned so that the eccentricity of the central opening within its flange formation is not substantially displaced angularly with respect to the eccentricity of said threaded surfaces, then the coupled male and female portions are readily separable because said flange formation will not protrude into said groove.

In the above description it is assumed that the engaging telescoping surfaces of the male and female parts are concentric with respect to the main axis of the coupling, but a generally equivalent result is obtainable if the cavity in the female part is formed or considered as being eccentric to the axis of the coupling while said threaded areas are concentric therewith so that either in this case or in the case described above, the opening in the flange formation will be eccentric with respect to the effectively eccentric supporting means for the nut, and so that the eccentricities may be either displaced about 180° when the coupling is locked together, or alternatively not displaced with respect to each other when the coupling is to be free for separation. Such equivalents are intended to be comprehended under the following description and in the appended claims.

Various further and more specific objects, features and advantages of the invention will appear from the description given below, taken in connection with the accompanying drawings, illustrating by way of example a preferred form of the invention.

Figure 3:
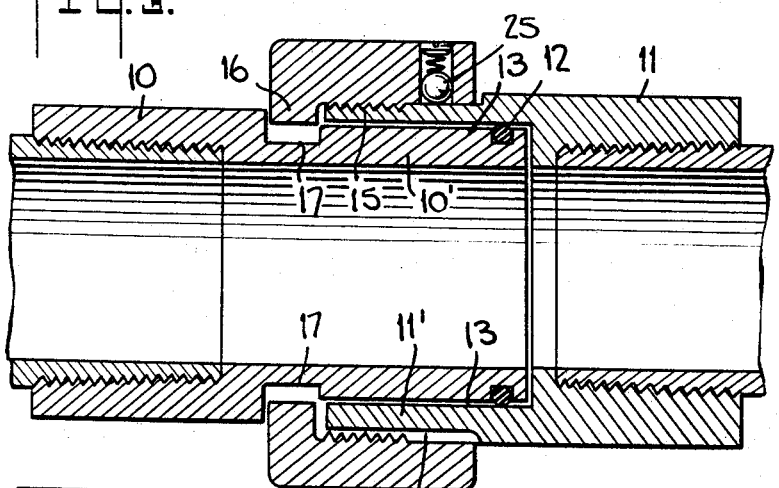
Figure 2:
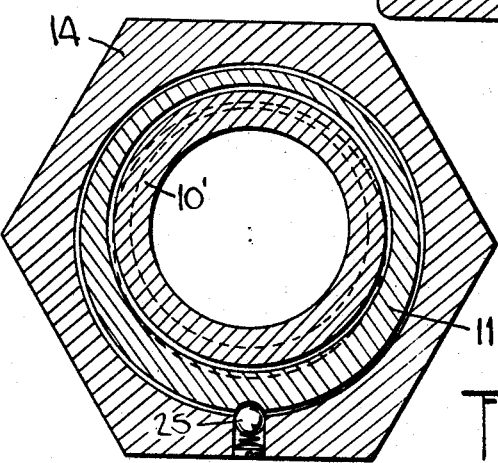
Figure 4:
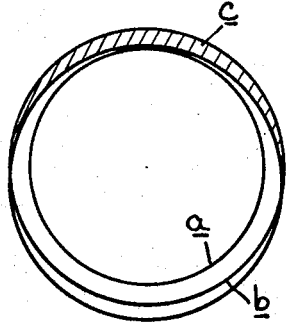

In the drawings:
FIG. 1 is a vertical sectional view showing a preferred example of the invention;
FIG. 2 is a transverse sectional view taken substantially along line 2—2 of FIG. 1;
FIG. 3 is a view like that of FIG. 1, but showing the parts in separable condition; and
FIG. 4 is a diagram for illustrating features of the invention.

Referring to the drawings in further detail, male and female coupling parts are shown at 10 and 11 respectively, formed with telescoping portions 10′ and 11′. The inner end of the male portion may be provided with suitable sealing means, such as an O-ring seal, as indicated at 12, of conventional form, for engaging the interior of a bore 13 within the female member 11. The coupling is embraced by a nut 14 having threaded engagement, as indicated at 15, with the correspondingly threaded exterior surface of member 11. This nut has an inwardly-directed flange-like formation 16, adapted to be received within an annular groove 17 formed around on the neck of the male member 10. The annular groove 17 may be coaxial with respect to the member 10, but the flange formation has an internal bore or circular opening located eccentrically with respect to said axis and with respect to said threaded surfaces, their eccentricities being relatively displaced angularly so that with the parts as shown in the lower portion of FIG. 1, there is a substantial space, as indicated at 18, between the inner surface of the flange and the base of the groove 17. And as shown at the upper portion of FIG. 1, the eccentricities are such that there is little or no space at 19 between the base 17 of the groove and the inner face of the flange. Thus with the parts as shown in FIG. 1, the inner portions of the flange 16 for a considerable part of the distance annularly around same, will be locked against separation in a direction longitudinally of the coupling past the portion 20 on the male member. This condition is illustrated diagrammatically in FIG. 4, wherein the circles a and b are intended to indicate therebetween the depth of the groove 17 and where the crescent-shaped cross-hatched area c indicates the depth to which the flange formation on the nut extends into the groove when the coupling is locked together. It will be noted that the flange formation protrudes into the groove over an arc extending for about 180°. The maximum depth to which the flange formation extends into the groove may, of course, be varied by varying the relative eccentricities of the parts, and this will also to some extent vary the total angular scope over which the flange protrudes into the groove. But when the nut is turned through 180°, then the eccentricity of its bore will be compensated for by the previously oppositely-displaced eccentricity of the threaded areas, so that the flange will not extend into the groove at all, and the coupling parts become freely separable.

Suitable retaining means may be provided to insure that the nut will remain in relation to the other parts, as shown in FIG. 1, when the coupling is to be locked together. For example, such retaining means may take the form of a spring-pressed ball 25 (or, if preferred, a small setscrew) protruding through the nut and into a longitudinal slot 26 formed on the surface of the member 11, thus preventing the nut from being accidentally turned about the female member 11. But when it is desired to separate the parts of the coupling, either the nut may be turned with sufficient force to dislodge the ball from the groove, or, if a setscrew is used, the setscrew may be released to permit the nut to be turned through about 180°. It will be apparent that the spring-pressed ball or the equivalent may be used as a stop means, so that when the ball snaps into place in the groove, an indication will thereby be given that the above-described eccentricities are displaced 180° apart, whereby the coupling parts will be in locked-together condition.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A detachable coupling comprising in combination: first and second telescopically interengaging coupling parts; a locking sleeve member for retaining said parts in coupled relation, said locking sleeve member being threadedly longitudinally adjusted onto one of said parts and rotatable thereon eccentrically with respect to the other of said parts; and relatively eccentrically positioned radially-extending formations respectively on said locking sleeve member and on said other of said parts, said formations being in the configuration of a flange and a mating annular groove respectively in relative eccentric positioning whereby when said locking sleeve member is turned to one angular position with respect to said one part, a crescent-shaped portion of said flange configuration will protrude into said groove formation, thus locking the parts against separation, but when the locking sleeve member is turned to another angular position, said flange formation will not protrude into said groove, thus rendering the parts separable.

2. A detachable coupling comprising in combination: first and second telescopically interengaging coupling parts; a locking sleeve member for retaining said parts in coupled relation, said locking sleeve member being secured to one of said parts and rotatable thereon eccentrically with respect to the other of said parts; a pair of relatively eccentrically positioned radially extending formations respectively on said locking sleeve member and on said other of said parts, said formations being in the configuration of a flange and a mating groove respectively in relative eccentric positioning whereby when said locking sleeve member is turned to one angular position with respect to said one part, a crescent-shaped portion of said flange configuration will protrude into said groove formation, thus locking the parts against separation, but when the locking sleeve member is turned to another angular position, said flange formation will not protrude into said groove, thus rendering the parts separable; and detent means arranged between said locking sleeve member and said one part to impede relative rotation between the two when said locking sleeve member is in said one angular position.

3. A coupling as in claim 2 wherein said detent means comprises a spring biased projecting member which extends between grooves in said locking sleeve member and said one part, said grooves being in alignment when said locking sleeve member is in said one angular position.

4. A coupling as in claim 3 wherein said locking sleeve member is threaded to said one part and wherein one of said grooves extends in a longitudinal direction, the detent means being carried in the other groove.

References Cited

UNITED STATES PATENTS

| | | | |
|---|---|---|---|
| 1,668,921 | 5/1928 | Miks | 285—90 |
| 1,872,048 | 8/1932 | Thomas | 285—178 X |

FOREIGN PATENTS

| | | |
|---|---|---|
| 467,544 | 10/1928 | Germany. |
| 28,156 | 1913 | Great Britain. |
| 191,919 | 1/1923 | Great Britain. |

EDWARD C. ALLEN, *Primary Examiner.*

CARL W. TOMLIN, *Examiner.*

T. F. CALLAGHAN, *Assistant Examiner.*